Sept. 28, 1971  W. L. HOCK  3,608,325
METHOD AND APPARATUS FOR STOPPING ICE CREAM FREEZERS
Filed Sept. 8, 1969  2 Sheets-Sheet 1

INVENTOR
WALTER L. HOCK

Anderson, Luedeka, Fitch, Even, & Tabin
ATTYS.

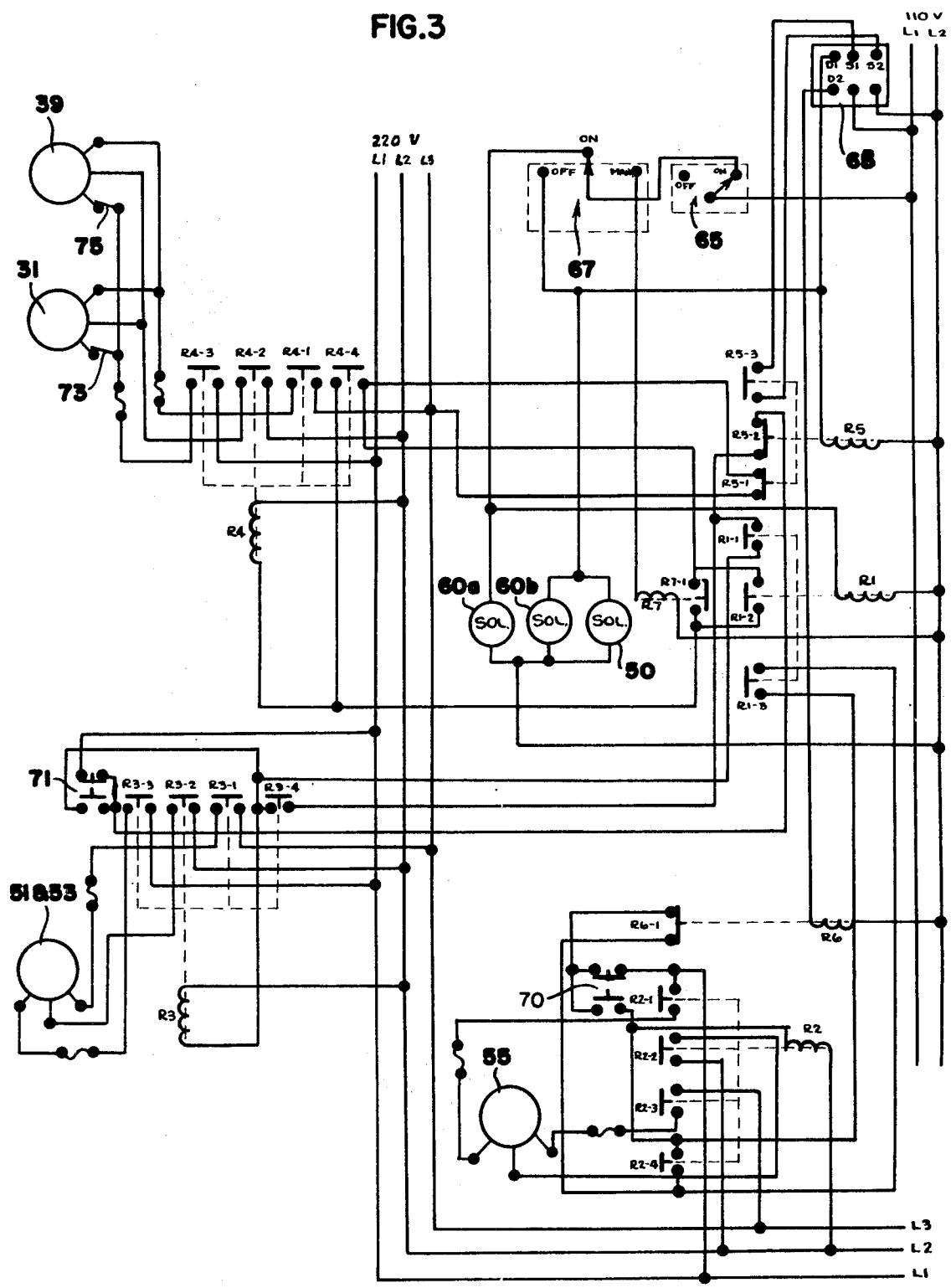

United States Patent Office 3,608,325
Patented Sept. 28, 1971

3,608,325
METHOD AND APPARATUS FOR STOPPING ICE CREAM FREEZERS
Walter L. Hock, Skokie, Ill., assignor to Kraftco Corporation, New York, N.Y.
Filed Sept. 8, 1969, Ser. No. 855,985
Int. Cl. A23g 5/00
U.S. Cl. 62—70                               6 Claims

ABSTRACT OF THE DISCLOSURE

A method and apparatus are provided to simultaneously shut down various pieces of equipment in the freezing section of an ice cream manufacturing line and to sequentially shut down other pieces of equipment after a predetermined time has elapsed.

---

The present invention relates generally to a method and apparatus for operating ice cream freezing equipment and more particularly relates to a method and apparatus for preventing substantial amounts of rework material during the production of ice cream.

In the manufacture of ice cream, it has heretofore been the practice to continuously operate the ice cream freezer equipment during a production run. If equipment failure occurs on the packaging line or elsewhere, the freezer apparatus is continuously operated to produce more ice cream. The ice cream which is produced during this period is collected in large containers and is thereafter introduced into the ice cream manufacturing process as "rework" ice cream. This is, of course, an uneconomical procedure in that substantial amounts of ice cream which are produced by the freezer do not get packaged and must instead be diverted back to the starting point in the manufacturing process and again be frozen. This is particularly undesirable where a change in flavors occurs, and the reworked ice cream is of a different flavor than is desired to be manufactured. Also, if the rework ice cream contains particulate material, such as fruit, nuts or candies, the particulate material must be strained from the rework ice cream prior to re-use of the rework ice cream in the manufacturing process.

It would be desirable to stop the freezer and discontinue the manufacture of ice cream when there is a malfunction of the packaging line. However, if the freezer is stopped, the ice cream within the freezer hardens and start-up of the freezer thereafter is impossible until the hardened ice cream has been removed by partial thawing. The partially thawed ice cream which is removed is not usable and must also be reworked. Consequently, it has not been generally considered feasible to stop an ice cream freezing line for a brief malfunction of the packaging line.

Accordingly, it is the principal object of the present invention to provide a method and apparatus for instant stopping of an ice cream freezing line. It is another object of the present invention to provide a method and apparatus for eliminating rework ice cream during the ice cream manufacturing process. It is a further object of the present invention to provide a method and apparatus for stopping ice cream freezing equipment during a production run without blocking the ice cream freezer with hardened ice cream.

These and other objects of the present invention will become more apparent from the following detailed description and the accompanying drawings, wherein:

FIG. 3 is an electric circuit diagram.

Figure 1:
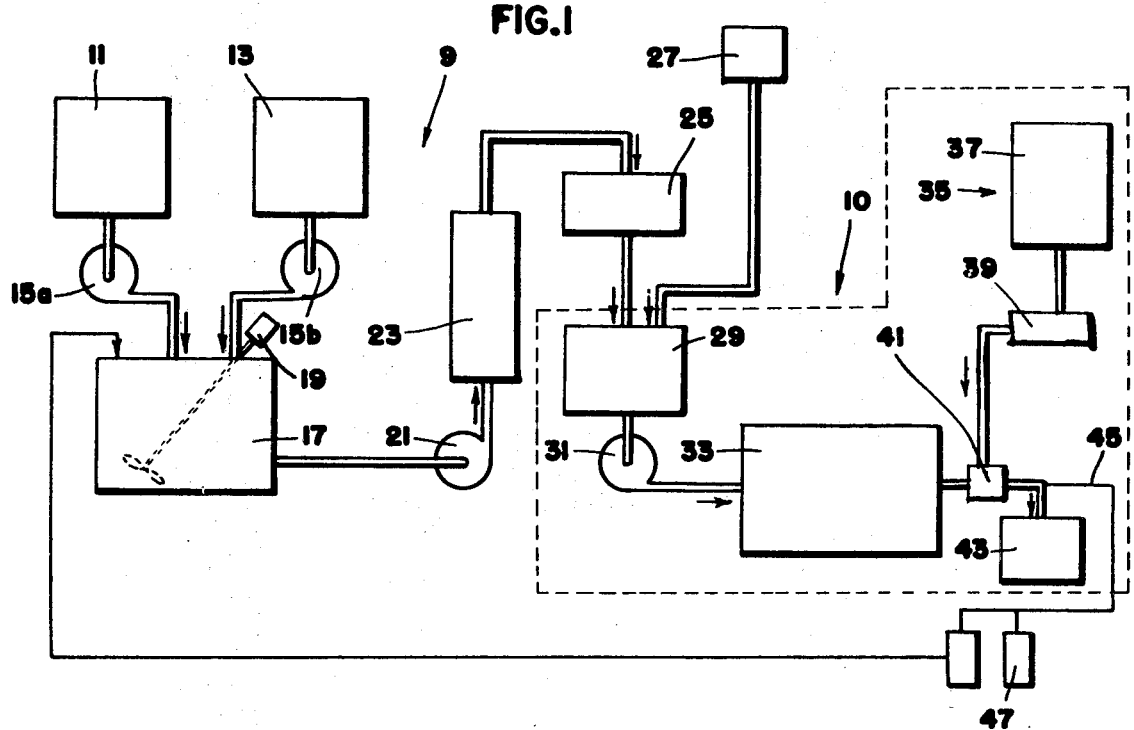
FIG. 1 is a flow diagram of an ice cream freezing line.

In general, the method and apparatus of the present invention are used in combination with an ice cream manufacturing line. As shown in FIG. 1, an ice cream manufacturing line comprises a mix section 9 and a freezing section 10. The mix section 9 is intermittently operated to prepare a batch of ice cream mix. The freezing section 10, in accordance with prior art processes for making ice cream, is operated continuously until a batch of ice cream mix has been frozen to provide ice cream. The method and apparatus of the invention are used to simultaneously shut down various pieces of equipment in the freezing section of an ice cream manufacturing line and to sequentially shut down other pieces of equipment after a predetermined time period has elapsed. The method and apparatus of the invention will be particularly described with reference to an ice cream manufacturing operation. However, it should be understood that the method and apparatus of the invention are equally useful in the manufacture of other frozen desserts, such as sherbert, ice milk and other frozen dessert products.

Referring now particularly to the drawings, in FIG. 1 is set forth the flow sheet for a typical ice cream manufacturing line. In the mix section 9, ice cream ingredients such as cream milk, sugar and stabilizers are stored in tanks, such as tank 11 and tank 13. Pumps, such as 15a and 15b are used to transfer the ice cream ingredients from the tanks 11 and 13 to the weighing tank 17, where they are blended by the mixer 19 to provide a basic mix. The basic mix is then pumped by pump 21 through pasteurizing and homogenizing equipment 23 to an interim storage tank 25. The basic mix is withdrawn as required from the interim storage tank 25 and combined with a metered amount of flavoring from flavor storage tank 27 to provide ice cream mix. The ice cream mix is stored in mix tank 29. During a production run for the manufacture of ice cream the ice cream mix is withdrawn from mix tank 29 and is transferred to the freezing section 10. The ice cream mix is frozen to provide ice cream in the freezing section 10, which is shown within the dotted area of FIG. 1.

The freezing section 10 includes mix pump 31 for effecting transfer of the ice cream mix and an ice cream freezer 33. The ice cream freezer 33 will be described in more detail hereinafter in connection with various features of the invention. The freezing section 10 may include a fruit-feeding system 35 for adding fruit, nuts or candies to the ice cream. The fruit feeding system 35 includes a storage hopper 37, a metering auger 39 and a feeding means 41. The flavored ice cream is then packaged by means of packaging equipment 43.

As previously indicated, it has heretofore been the practice in the ice cream industry to continuously operate the freezer 33 after a run has been started. If a temporary malfunction occurs in the packaging equipment 43 or elsewhere, the ice cream is diverted through line 45 to cans 47. The cans of ice cream 47 are then stored until rework can be effected. Rework is accomplished by transferring the cans with the ice cream back to weighing tank 17. If the ice cream to be reworked contains particulate material, the particulate material must first be strained from the ice cream prior to introduction of the ice cream to the mix tank 17.

Figure 2:
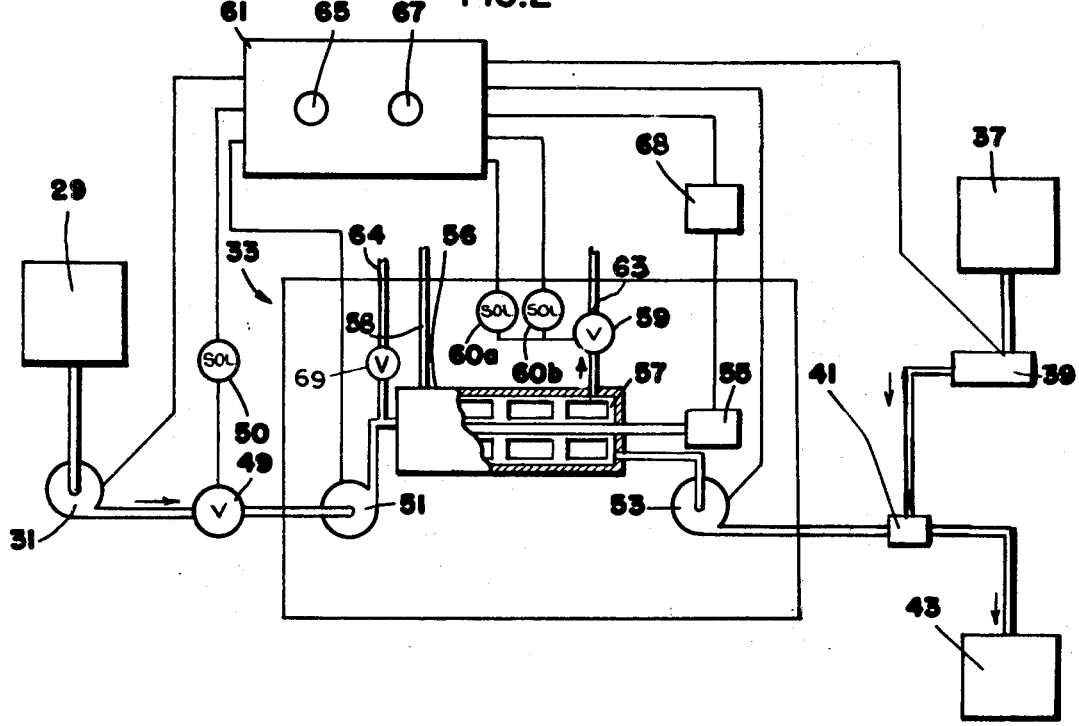
FIG. 2 is an enlarged flow diagram of the appparatus within the dotted area of FIG. 1, depicting various features of the present invention.

The apparatus of the invention will now be described more particularly with reference to FIG. 2. As previously described, ice cream mix is held in tank 29. The ice cream mix is pumped to the freezer 33 by means of pump 31. As shown in FIG. 2, freezer 33 comprises freezer pump 51 and ice cream pump 53. In commercially available freezers, freezer pump 51 and ice cream pump 53 are coupled to the same drive system and are operated by a single motor. Freezer pump 51 feeds the ice cream mix to freezing tube 56. Liquid refrigerant is introduced to a hollow shell enveloping freezing tube 56 through line 58 and exits as a vapor from the hollow shell through valve 59 by means of line 63. Valve 59 is turned on by solenoid 60a and is turned off by solenoid 60b. Air is introduced into the ice cream mix through line 64. The air is fed at predetermined levels to provide a desired level of overrun in the ice cream.

Freezing tube 56 further comprises a dasher 57, which is driven by dasher motor 55. In accordance with conventional ice cream procedure, the dasher 57 scrapes ice cream from the walls of the freezing tube 56 as it forms to facilitate heat transfer and to incorporate air in the ice cream. The ice cream exits from freezer tube 56 and is pumped by ice cream pump 53 to a packaging line 43. Particulate material may be added to the ice cream by means of the fruit feeder system 35 as previously described.

Valve 49 is interposed between mix pump 31 and freezer pump 51 to prevent back-up of ice cream from the freezing tube 56 when the system is shut down, as will be described more fully hereinafter. Valve 49 is closed by solenoid 50. Valve 49 is further provided with a spring return (not shown) which opens valve 49 when solenoid 50 is inactivated.

As shown in FIG. 2, each of the motors of pumps 31, 51 and 53, metering auger 39 and solenoid 60a, 60b and 50 are connected electrically to control box 61. The dasher motor 55 is connected to the control box 61 through a triggered delay circuit 68. Control box 61 contains a master power switch 65 and a control switch 67. It has been discovered that a timed sequence of shut-down of the various pumps, motors and valves as shown in FIG. 2 will prevent ice cream contained in the system from becoming unuseable and will prevent hardening of the ice cream contained in the system. In accordance with the invention, when control switch 67 is thrown to the "Off" position by the operator, the following sequence of events is actuated: Pumps 31, 51, 53 and metering auger 39 are stopped; valves 49 and 59 are closed by solenoids 50 and 60b respectively, and triggered delay circuit 68 is actuated.

Triggered delay circuit 68 provides a delay in time before dasher motor 55 is stopped. The delay in time permits dasher motor 55 to scrape ice cream from the surface of the freezing tube 56 until the residual cooling of refrigerant contained in the hollow shell of the freezing tube 56 has been used to freeze ice cream. In this connection, valve 59 is positioned in the vapor return line of the refrigerant system. Closing of valve 59 permits the pressure of vapor within the hollow shell to drive liquid refrigerant from the hollow shell and back through liquid refrigerant feed line 58. Thereafter, since valve 59 has been closed, no further liquid refrigerant is introduced to freezing tube 56 and the dasher motor 55 may be stopped. It has been found that the dasher motor 55 should be run for a period of time of from about 5 seconds to about 90 seconds after the switch 67 is turned to the "Off" position. If the dasher motor is allowed to run longer than about 90 seconds, the ice cream contained in the freezing tube 56 acquires an undesirable texture, and the packages of ice cream which are filled immediately after starting up are unusable. If the dasher motor 55 is shut off sooner than about 5 seconds after switch 67 is turned to the "Off" position, there is still enough residual freezing left in the refrigerant in the shell of freezing tube 56 to harden ice cream on the inner surface of the freezing tube 56 and interfere with subsequent start-up.

It is not necessary to shut off air line 64. However, air line 64 may be shut off automatically by a valve and solenoid combination as previously described, if desired. Check valve 69 prevents ice cream from entering air line 64. Even if air line 64 is shut off the line leading from freezer pump 51 to freezing tube 56 is under pressure. Valve 49 prevents back-up of frozen ice cream through freezer pump 51. If ice cream is permitted to back up past freezer pump 51, the pressure developed by freezer pump 51 will be insufficient upon subsequent start-up.

The electric circuit diagram of FIG. 3 sets forth an electric circuit that may be used to effect the controlled sequence of shut-down of the invention. As shown in FIG. 3, when power switch 65 is turned to the "On" position, power is fed to the central terminal of switch 67. When switch 67 is placed in the "On" position, relay R–1 is activated and relay contacts R1–1, R1–2 and R1–3 are closed. The closing of relay contacts R1–3 completes a circuit and activates relay R2, in the dasher motor control circuit. When relay R2 is activated, relay contacts R2–1, R2–2, R2–3 and R2–4 are closed. Relay contacts R2–1, R2–2 and R2–3 complete the circuit in each line of a 3-phase 220 volt input to dasher motor 55 and start the dasher motor. Relay contact R2–4 is a holding contact. After relay contact R2–4 is closed, the circuit is no longer dependent upon delay contact R1–3 being closed. Dasher motor 55 may be stopped in an emergency by depressing the momentary contact switch 70.

In a similar manner, relay contacts R1–1 activate relay R3 which complete the circuit and start freezer pump 51 and ice cream pump 53. Relay contacts R1–2 activate relay R4, mix pump 31 and fruit feeder metering auger 39.

The "On" position of switch 67 also activates solenoid 60a which opens valve 59. The opening of valve 59 permits refrigerant to start flowing through the shell of freezer tube 56.

When it is desired to stop the ice cream line, the switch 67 is turned to the "Off" position. In the "Off" position relay R5 is activated, which opens relay contacts R5–1 and R5–2 and closes relay contact R5–3. When relays R5–1 and R5–2 are opened, they interrupt the circuit activating relays R4 and R3 and the contacts which have been closed by relays R4 and R3 are opened, which in turn shuts off freezer pump 51, ice cream pump 53, mix pump 31 and fruit feeder metering auger 39. Relay R6, which controls the shut-off of dasher motor 55, is not effected by the change of position of switch 67 to the "Off" position. Closing of relay contact R5–3, however, activates the triggered delay circuit 63 by completing the circuit between contacts S–1 and S–2 of the triggered delay circuit. After a predetermined time, the triggered delay circuit completes the circuit between contacts D1 and D2 of the triggered delay circuit. This in turn completes the circuit for relay R6 and opens the contact R6–1. The opening of relay contact R6–1 shuts off dasher motor 55.

In the "Off" position of switch 67, solenoids 50 and 60b are activated and solenoid 60a is inactivated. Solenoids 50 and 60b close valves 49 and 59, respectively, as previously described.

The circuit described in FIG. 3 also contains a manual mode wherein switch 67 may be turned to a manual position as indicated. This inactivates relay R–1 and opens relay contacts R1–1, R1–2 and R1–3. However, holding contacts R2–4, R3–4 and R4–4 continue to complete the circuit required for operation of the dasher motor 55, mix pump 31, fruit feeder metering auger 39 and freezer pump 51 and ice cream pump 53. These pumps may be shut off by hand by depressing the momentary stop switch 69 in the case of dasher motor 55, or monmentary switch 71 in the case of freezer pump 51 and ice cream pump 53. Switches 73 and 75 may be used to shut off mix pump 31 and fruit feeder metering auger 39 respectively. A shunt circuit is also activated when switch 65 is placed in the manual mode. The shunt circuit comprises relay R7, which is activated and closes relay contacts R7–1. This places relay R4 in a constantly activated position and maintains closure of contacts R4-1, R4–2, R4-3 and R4-4. This permits manual operation of mix pump 31 and fruit feeder auger 39 by means of the switches 73 and 75.

It will be readily apparent to one skilled in the art that numerous alternative embodiments of the electric circuit diagram shown in FIG. 3 may be prepared. However, the electric circuit described in FIG. 3 should not be considered to be limiting the scope of the invention, which is defined in the appended claims.

What is claimed is:

1. In an ice cream manufacturing line containing a freezer pump, a freezing tube for ice cream, an ice cream pump, a dasher motor, and a refrigeration system, apparatus for rapid shut-down of the ice cream line comprising means for substantially simultaneous shut-off of the freezer pump and ice cream pump, a valve in the vapor line of said refrigeration system, means for shutting said valve substantially simultaneously with the shut-off of said pumps, means for containing said ice cream under pressure in said freezing tube after shut-off of said pumps, and dasher motor shut-off means to delay dasher motor shut-off a predetermined period of time after said pumps are shut off and said valve is closed, whereby said dasher motor is operable long enough after said pumps are shut-off and said valve is closed to maintain desirable texture of ice cream contained in said freezing tube during residual freezing while the inner surface of said freezing tube is kept free of said ice cream, but not so long that dasher agitation causes said ice cream to become unusable.

2. A system in accordance with claim 1 wherein said dasher motor shut-off is delayed for a time period of from about 5 seconds to about 90 seconds from the time when said pumps are shut off and said valve is closed.

3. A system in accordance with claim 1 wherein said means for containing said ice cream under pressure comprises a valve upstream of said freezing tube and means for shutting said valve.

4. A method for effecting rapid shut-down of an ice cream manufacturing line containing a freezer pump, an ice cream pump, a dasher motor, a freezing tube for ice cream and a refrigeration system comprising simultaneous shut-off of said freezer pump and said ice cream pump, stopping the flow of gaseous refrigerant from said freezing tube substantially simultaneously with the shut-down of said pumps, containing said ice cream under pressure in said freezing tube after shut-down of said pumps, and effecting shut-off of said dasher motor a predetermined period of time after said pumps are shut off and said refrigerant flow is stopped, whereby said dasher motor is operable long enough after said pumps are shut off and said gaseous refrigerant flow is stopped to maintain desirable texture of ice cream contained in said freezing tube during residual freezing while the inner surface of said freezing tube is kept free of said ice cream, but not so long that dasher agitation causes said ice cream to become unusable.

5. A method in accordance with claim 4 wherein said period of time that the shut-off of said dasher motor is delayed is from about 5 seconds to about 90 seconds.

6. A method in accordance with claim 4 wherein back-up of ice cream upstream out of said freezing tube is prevented.

References Cited

UNITED STATES PATENTS

| | | | |
|---|---|---|---|
| 2,877,632 | 3/1959 | Chaplik et al. | 62—137X |
| 3,059,444 | 10/1962 | Bickel et al. | 62—135 |
| 3,365,901 | 1/1968 | Guard | 62—233X |

WILLIAM E. WAYNER, Primary Examiner

U.S. Cl. X.R.

62—233